(12) United States Patent
Foote et al.

(10) Patent No.: US 9,303,686 B2
(45) Date of Patent: Apr. 5, 2016

(54) BEARING ASSEMBLY

(75) Inventors: Dean Foote, Edmonton (CA); Randy Pustanyk, Chestermere (CA)

(73) Assignee: Cathedral Energy Services Ltd., Nisku, Alberta (CA)

(*) Notice: Subject to any disclaimer, the term of this patent is extended or adjusted under 35 U.S.C. 154(b) by 1011 days.

(21) Appl. No.: 13/459,835

(22) Filed: Apr. 30, 2012

(65) Prior Publication Data

US 2012/0275736 A1     Nov. 1, 2012

Related U.S. Application Data

(60) Provisional application No. 61/481,046, filed on Apr. 29, 2011.

(51) Int. Cl.
*F16C 19/54* (2006.01)
*F16C 33/76* (2006.01)
*F16C 35/06* (2006.01)

(52) U.S. Cl.
CPC .............. *F16C 19/54* (2013.01); *F16C 33/76* (2013.01); *F16C 35/06* (2013.01); *F16C 2352/00* (2013.01)

(58) Field of Classification Search
CPC .................................. E21B 4/003; E21B 4/02
See application file for complete search history.

(56) References Cited

U.S. PATENT DOCUMENTS

| | | | |
|---|---|---|---|
| 4,260,031 A * | 4/1981 | Jackson, Jr. | E21B 4/003 175/107 |
| 4,577,704 A * | 3/1986 | Aumann | E21B 4/003 175/107 |
| 5,660,481 A | 8/1997 | Ide | |
| 5,964,307 A | 10/1999 | Wenzel | |
| 5,964,414 A | 10/1999 | Hardy et al. | |
| 6,202,762 B1 | 3/2001 | Fehr et al. | |
| 6,334,713 B1 | 1/2002 | Chu | |
| 7,500,787 B2 | 3/2009 | Cioceanu | |
| 7,762,356 B2 | 7/2010 | Turner et al. | |
| 2007/0092169 A1 | 4/2007 | Johnson | |
| 2009/0272581 A1 | 11/2009 | Beylotte et al. | |
| 2010/0326730 A1 | 12/2010 | Prill et al. | |
| 2011/0012455 A1 * | 1/2011 | Scott | E21B 4/003 310/90 |

OTHER PUBLICATIONS

TomaHawk SuperHawk Service Manual. The Cutting Edge: In Drilling Motors and Drilling Motor Components. Rev. 2, 2008.

* cited by examiner

*Primary Examiner* — Thomas R. Hannon
(74) *Attorney, Agent, or Firm* — Davis & Bujold PLLC; Michael J. Bujold

(57) ABSTRACT

A bearing assembly has a bearing chamber, an inner mandrel having a first load bearing shoulder and an outer housing having an second load bearing shoulder. The first and second load bearing shoulders are opposed and are within the bearing chamber. Seals retain a bearing lubricant within the bearing chamber. A cylindrical stack of bearings are positioned between the first and second load bearing shoulders. Each row of bearings has an inner race supporting the first load bearing shoulder and an outer race supporting the second load bearing shoulder. The bearing assembly may be incorporated into a downhole tool. The downhole tool may continue to be operated after the seals fail by flowing a working fluid through the bearings.

10 Claims, 5 Drawing Sheets

BEARING ASSEMBLY

FIELD

This relates to a bearing assembly for a downhole tool.

BACKGROUND

There are two basic types of bearing assemblies used for down-hole drilling motors in the oil and gas industry: sealed assemblies and mud-lubricated assemblies.

The oil sealed assembly uses seals to separate an oil chamber from the drilling fluid. This style is fitted with common precision bearings within the oil chamber to accommodate the thrust and radial loads required for the drilling processes. These bearings are designed to operate in a fluid that is free of particles that cause wear. It is essential that the seals separating the drilling fluid from the oil do not fail. Invasion of the oil chamber by drilling fluid causes severe damage to the precision bearing components and leads to premature failure of the drilling motor. This occurrence is expensive and can require the replacement of the drilling motor to continue drilling operations.

The mud lubricated bearing assembly does not use an oil sealed chamber. The load bearing components are exposed to a small flow of the drilling fluid to keep them cool and lubricated. They are usually less precise in their manufacture, and are expected to wear and be replaced regularly. One major disadvantage of the mud lubricated system is the load carrying capacity of the thrust bearings. To provide an equivalent thrust capacity in a mud lubricated assembly, several rows of roller balls and races, termed a "stack", must be utilized to equal the equivalent capacity of a single precision oil sealed bearing. In addition, the alternating rows of balls and races must share the load equally to be effective. As manufacturing these stacks with sufficient accuracy to ensure equal load sharing was found to be expensive and difficult, the stacks were manufactured to a reasonable economic accuracy and allowed to "wear-in" to achieve the load sharing. The bearing were able to wear-in due to the particles (abrasive solids), present in drilling fluids, which allowed load sharing to be quickly achieved in use and once achieved, provided a reasonably useful life for the mud lubricated stack. This type of wear-in cannot be tolerated in an oil sealed bearing assembly due to the much increased load requirements of a single bearing.

SUMMARY

There is provided a method of operating a downhole tool, wherein a downhole tool is provided having an inner mandrel having a first load bearing shoulder and an outer housing having a second load bearing shoulder, the first and second load bearing shoulders being opposed and installing a bearing assembly between the inner mandrel and the outer housing. The bearing assembly comprises a bearing chamber and a mud lubricated stack of bearings comprising a cylindrical stack of three or more rows of bearings positioned between the first and second load bearing shoulders within the bearing chamber. Each row comprises an inner race supporting the inner housing of the tool, an outer race supporting the outer housing of the tool, and ball bearings positioned between the inner race and the outer race relative to the longitudinal axis, such that upon application of a differential load between the inner housing and the outer housing of the tool, the differential load is transferred through the ball bearings to the opposite race. A lubricant is provided within the bearing chambers and sealing the bearing chamber with seals. The downhole tool is operated by rotating the inner mandrel relative to the outer housing until the seals fail. The downhole tool is continued to be operated while circulating a working fluid through the rows of bearings.

According to another aspect, the method may further comprises the step of detecting the seal failure and continuing to operate the downhole tool after detection.

According to another aspect, the bearings may be bidirectional ball bearings.

According to another aspect, the method may further comprise the step of providing a first bearing clamp supporting the outer race of the bearings adjacent to the first load bearing shoulder and a second bearing clamp supporting the inner race of the bearings adjacent to the second load bearing shoulder, wherein at least one of the first bearing clamp and the second bearing clamp comprises a threaded collar that engages a threaded portion on the inner mandrel or outer housing, the threaded collar selectively applying pressure to the race that is not supported by the respective load bearing shoulder, the threaded collar comprising an engagement profile that selectively engages one of the inner mandrel and the outer housing in a selected rotational position along the threaded portion.

According to another aspect, the first bearing clamp may comprise the threaded collar and the threaded portion is on the inner mandrel.

According to an aspect, there is provided a bearing assembly, comprising a bearing chamber, an inner mandrel having a first load bearing shoulder and an outer housing having a second load bearing shoulder, the first and second load bearing shoulders being opposed and within the bearing chamber. Seals retain a bearing lubricant within the bearing chamber. A mud lubricated stack of bearings comprising a cylindrical stack of three or more rows of bidirectional ball bearings is provided between the first and second load bearing shoulders and between the seals, each row of bearings comprising an inner race supporting the first load bearing shoulder and an outer race supporting the second load bearing shoulder.

According to another aspect, the cylindrical stack may comprise 6 or more rows, or 8 or more rows, of bidirectional ball bearings.

According to an aspect, there is provided a bearing assembly, comprising a bearing chamber, an inner mandrel having a first load bearing shoulder and an outer housing having a second load bearing shoulder, the first and second load bearing shoulders being opposed and within the bearing chamber. A cylindrical stack of one or more rows of bearings is disposed between the first and second load bearing shoulders, each row of bearings comprising an inner race supporting the first load bearing shoulder and an outer race supporting the second load bearing shoulder. A first bearing clamp supports the outer race of the bearings adjacent to the first load bearing shoulder and a second bearing clamp supports the inner race of the bearings adjacent to the second load bearing shoulder. At least one of the first bearing clamp and the second bearing clamp comprises a threaded collar that engages a threaded portion on the inner mandrel or outer housing, the threaded collar selectively applying pressure to the race that is not supported by the respective load bearing shoulder. The threaded collar comprises an engagement profile that selectively engages one of the inner mandrel and the outer housing in a selected rotational position along the threaded portion.

According to another aspect, the first bearing clamp may comprise the threaded collar and the threaded portion may be on the inner mandrel.

According to another aspect, the bearing assembly may further comprise a lubricant within the bearing chambers and seals to retain the lubricant.

According to another aspect, the bearing assembly may further comprise a spring element, such as a Belleville spring element, between the bearings and at least one of the first bearing clamp and the second bearing clamp.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
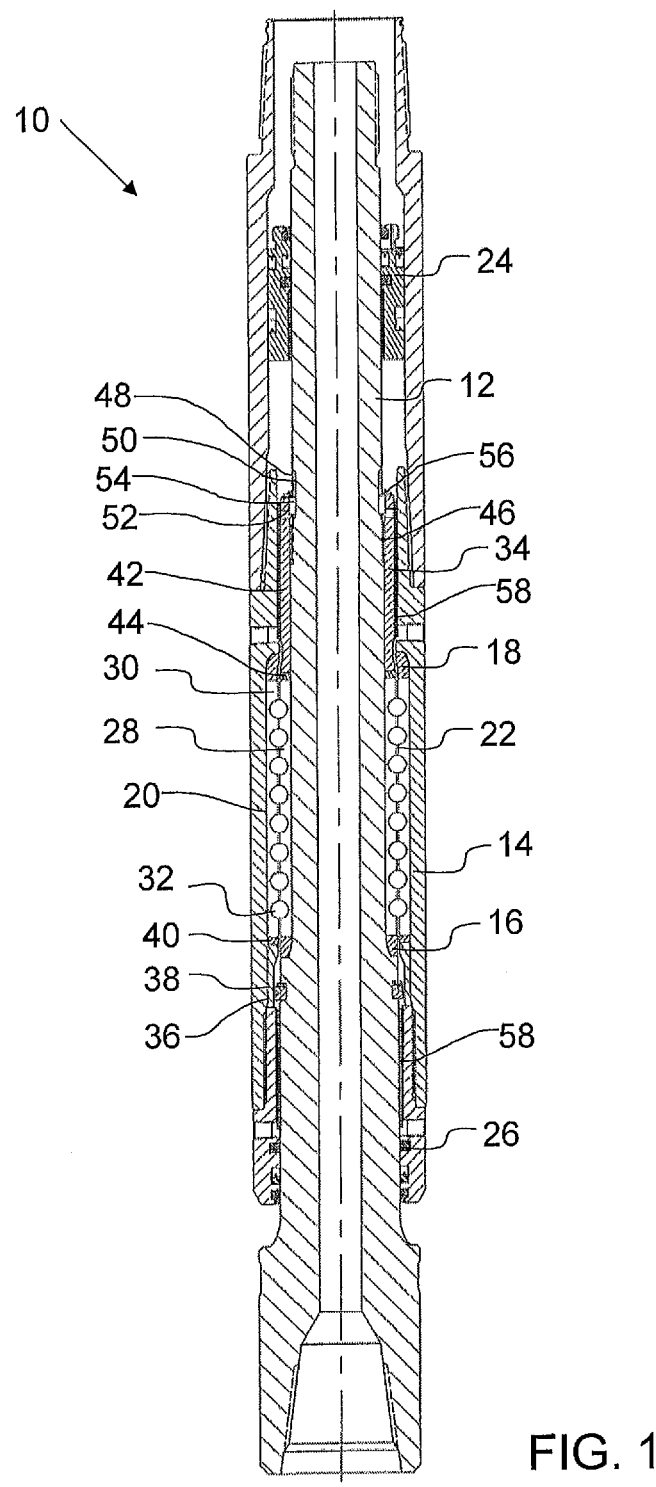
FIG. 1 is a side elevation view in section of a downhole tool with the bearing assembly.

A bearing assembly, generally indicated by reference numeral 10, will now be described with reference to FIG. 1 through 5. FIG. 1 depicts bearing assembly 10 as incorporated into a downhole tool, such as a drilling motor. Bearing assembly 10 is also suitable to be used on other downhole tools that have inner and outer sections that rotate relative to one another and require bearings. Bearing assembly 10 acts as the interface between these sections to maintain their relative position and ensure proper operation.

Referring to FIG. 1, bearing assembly 10 has an inner mandrel 12 and an outer housing 14 and a bearing chamber 20 between inner mandrel 12 and outer housing 14. Inner mandrel 12 has a first load bearing shoulder 16 and outer housing has a second load bearing shoulder 18. Bearing assembly 10 has a mud-lubricated stack of bearings, or rows of bearings 22 in a cylindrical stack as depicted, positioned within bearing chamber 20 between first load bearing shoulder 16 and second load bearing shoulder 18. Bearings 22 preferably directly engage load bearing shoulders 16 and 18. Load bearing shoulders 16 and 18 bear the load as transferred through bearings 22.

Seals 24 and 26 are provided above and below load bearing shoulders 16 and 18, such that chamber 20 may be filled with a lubricant, such as oil, which is maintained by seals 24 and 26. As can be seen, seal 24 is a floating seal, which equalizes the fluid pressure in bearing chamber 20 relative to the external fluid pressure in outer housing 14. Seal 26 is carried by a lower section of outer housing 12.

Figure 2:
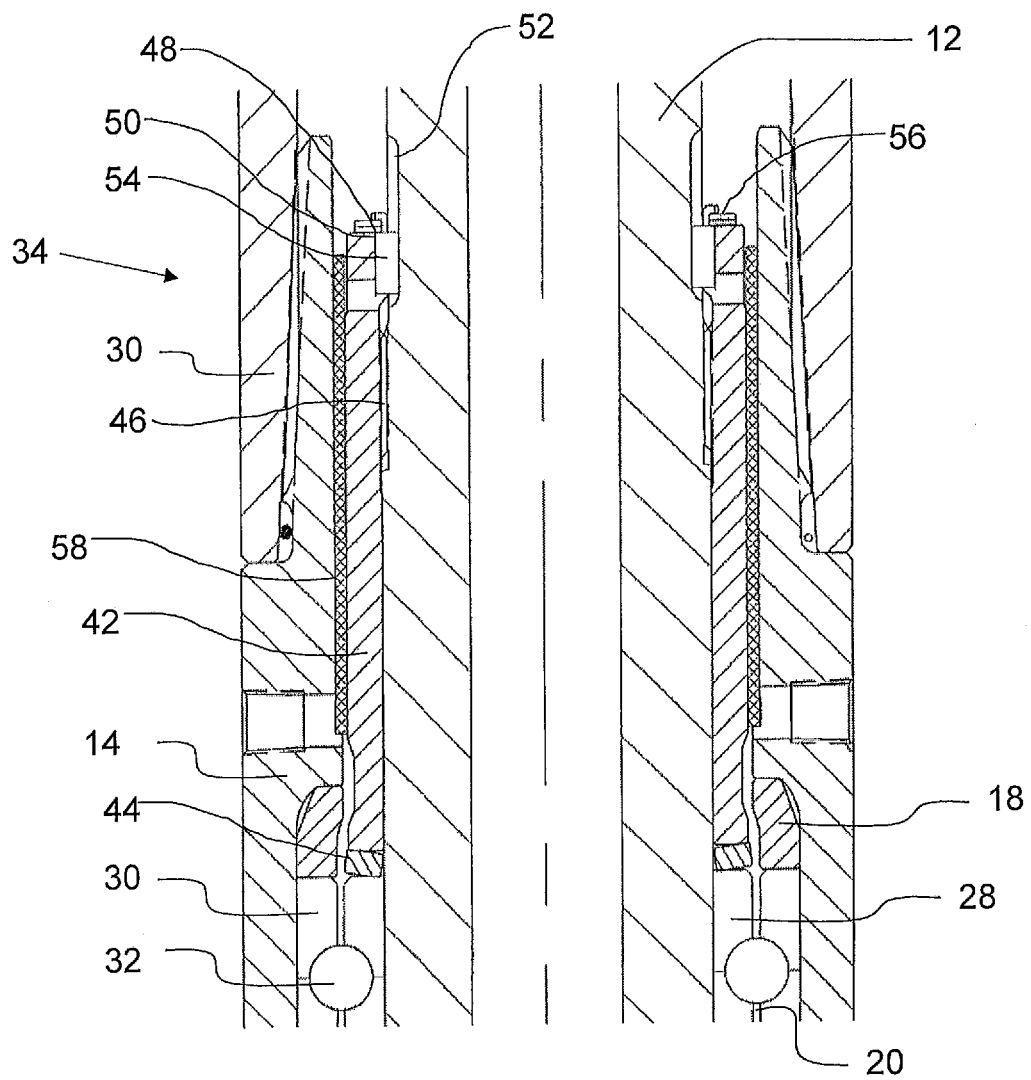
FIG. 2 is a detailed side elevation view in section of an upper portion of the bearing assembly.
Figure 3:
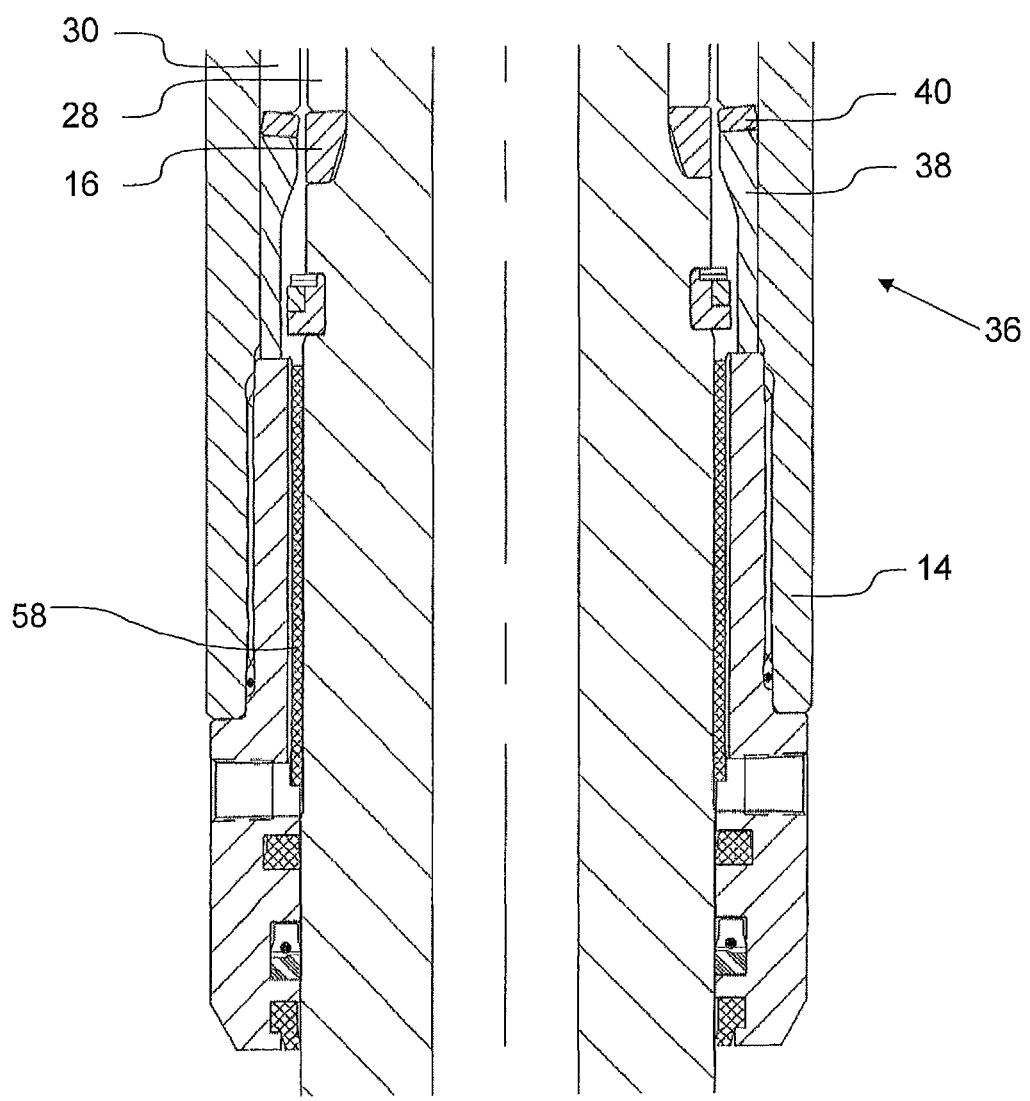
FIG. 3 is a detailed side elevation view in section of a lower portion of the bearing assembly.
Figure 4:
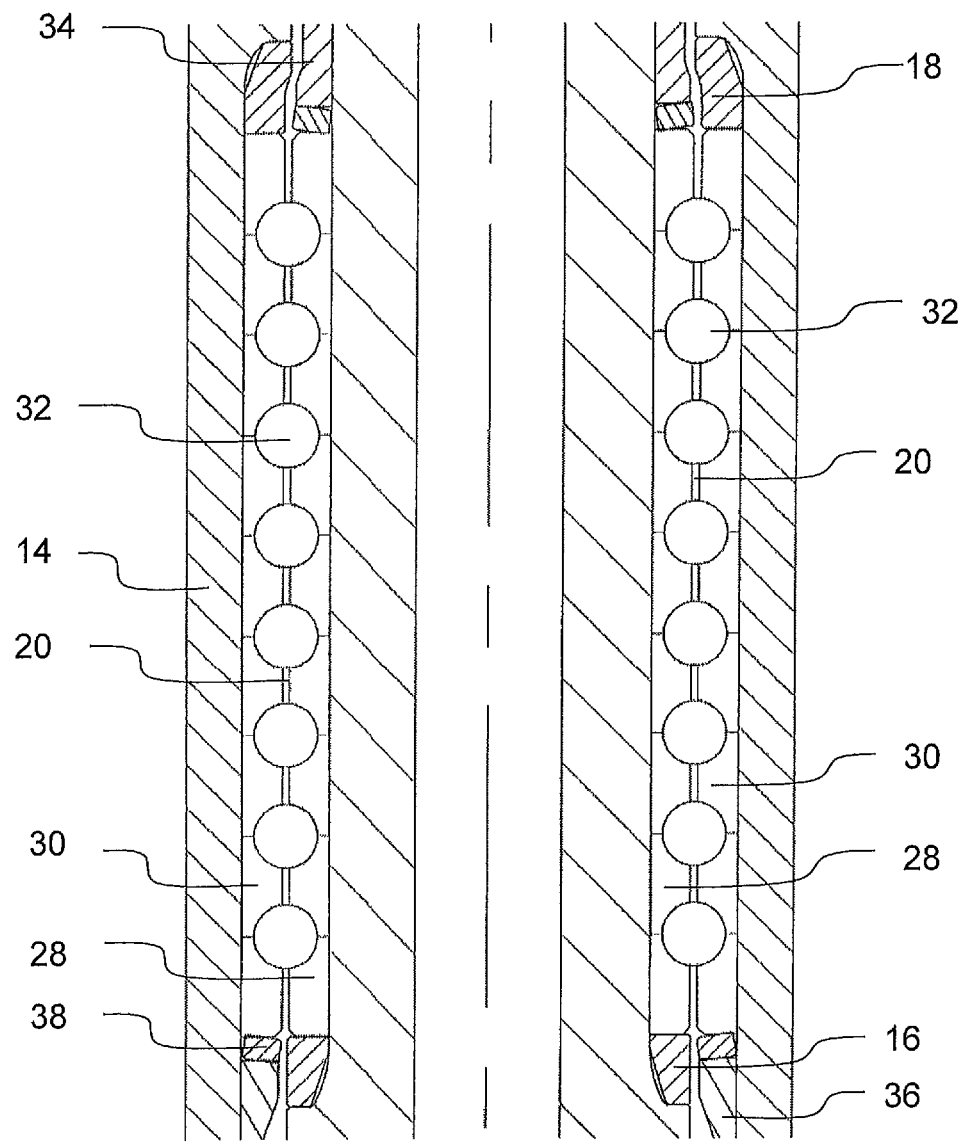
FIG. 4 is a detailed side elevation view in section of a bearing chamber.
Figure 5:
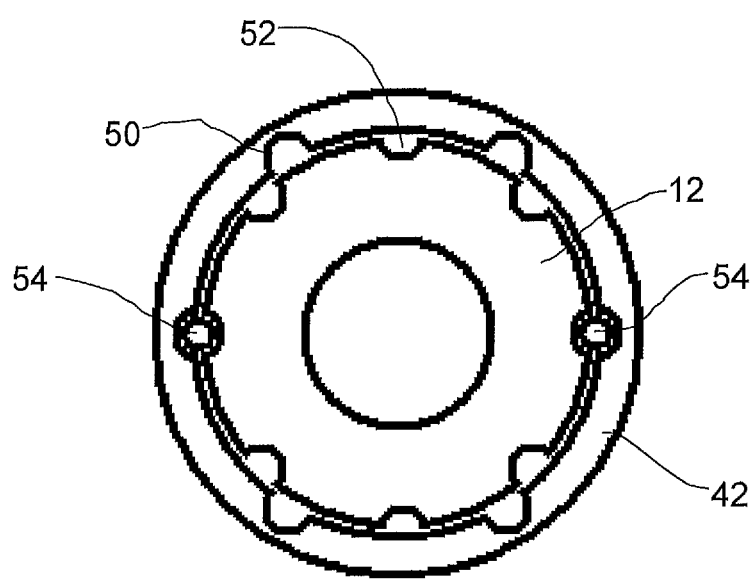
FIG. 5 is a top plan view in section of an upper bearing clamp.

Referring to FIG. 4, each bearing row 22 is centred about a longitudinal axis of the cylindrical stack. Each row 22 is made up of an inner race 28, an outer race 30, and ball bearings 32 positioned between inner race 28 and outer race 30 relative to the longitudinal axis. In order to simplify manufacturing and assembly, each of the inner and outer races 28 and 30 may be made from two components, where one component forms the top half of one race, and the bottom half of an adjacent race. The top and bottom components would only be required to form half of a race, and have a load bearing surface opposite the race. Referring to FIG. 2, outer race 30 of the top bearing row 22 is in contact with load bearing shoulder 18 and inner race 28 is in contact with a bearing clamp 34, described below. Referring to FIG. 3, inner race 28 of the bottom bearing row 22 is in contact with load bearing shoulder 16 while outer race 30 is in contact with another bearing clamp 36, also described below. The load is transferred through ball bearings 32 to the opposite race, depending on whether the load is applied upward or downward on inner mandrel 12 relative to outer housing 14. As can be seen in FIG. 4, bearings 22 are bidirectional bearings, meaning that both upward and downward forces are transmitted through bearings 22, regardless of whether they are applied to inner race 28 or outer race 30.

As depicted, Referring to FIG. 1, bearing chamber 20 is filled with a clean fluid that lubricates and cools ball bearings 32 and races 28 and 30. As mentioned, the fluid is maintained within bearing chamber 20 by seals 24 and 26. When seals 24 and 26 fail, the clean fluid will either drain, or fluids outside the bearing assembly will have access to bearings 22 inside chamber 20. Because of the number of rows of bearings 22, bearing assembly 10 continues to operate and is cooled and lubricated by allowing other fluids present downhole, such as drilling fluids which are often abrasive, to circulate through the bearing assembly. Preferably, there will be at least 6 rows of bearings 22, and more preferably, there will be at least 8 rows of bearings 22, however, there may be as few as 3, 4 or 5 rows of bearings 22.

The advantages of bearing assembly 10 described above is that the multiple rows of bearings 22 provide substantial radial load capacity in addition to their thrust capacity and secondly, in the event of a seal failure, bearing assembly 10 is able to continue operation as a mud lubricated bearing assembly. This feature helps improve reliability and offers extended life to finish a particular operation, rather than replacing a failed motor for the completion of a task. When incorporated into a drill string, bearing assembly 10 will be lubricated by drilling mud. In other types of tools, bearing assembly 10 will be lubricated by other working fluids that are pressurized and pumped through bearing assembly 10. In some tools, it may be possible to detect the seal failure, at which point the tool may be serviced or it may continue to be used as a mud lubricated bearing assembly as described above.

As shown, bearings 22 are held in place by bearing clamps 34 and 36. Bearing clamp 34 is positioned above bearings 22, and bearing clamp 36 is positioned below bearings 22. At either end of bearing chamber 20, bearing clamps 34 and 36 engage the inner or outer races 28 or 30, depending on which race is engaged by the respective load bearing shoulder 16 and 18.

Referring to FIG. 3, bearing clamp 36 below bearing chamber 20 is made up of a spacer element 38 that is supported by outer housing 14 and engages outer race 30. There may also be a spring element 40, such as a Belleville spring, between spacer element 38 and outer race 30. Inner race 28 is supported by load bearing shoulder 16 carried by inner mandrel 12. As shown, the portion of outer housing 14 that supports bearing clamp 36 is threaded onto another portion of outer housing 14.

Referring to FIG. 2, bearing clamp 34 above bearing chamber 20 includes a threaded collar 42 that engages inner race 28 with a Belleville spring element 44 between threaded collar 42 and inner race 28. Threaded collar 42 threads onto a threaded portion 46 on inner mandrel 12 and can be threaded to clamp inner races 28 to the desired amount. Threaded collar 42 has an engagement profile 48 that engages inner mandrel 12 to hold it in the desired position. In a preferred embodiment, engagement profile includes equally spaced groove 50 on an inner surface of threaded collar 42 and equally spaced grooves 52 on the outer surface of inner mandrel 12. In the example shown in FIG. 5, there are 6 equally spaced grooves carried by threaded collar 42, and 8 equally spaced grooves carried by inner mandrel 12, which allows collar 42 to be secured at 15 degree intervals and therefore increases the rotational positions at which grooves will align. Two pins 54 are then inserted into the matching grooves 50 and 52 in order to secure threaded collar 42 in place. A snap ring 56 may then be placed over pins 54 to keep them in place. Grooves 50 and 52 are preferably formed longitudinally as shown rather than radially. This decreases the stress being placed on pins 54 and therefore reduces the likelihood of a failure.

It will be understood that the clamps as described above may be arranged differently, such as with the position of clamp 34 and 36 reversed. However, this is less convenient for installation purposes. It will also be understood that bearing assembly 10 may be assembled using a different clamping design. It will also be understood that the clamping design described above may also be used to install other types of bearing assemblies that may or may not be sealed, and may or may not be bidirectional.

In addition to bearings 22, which act primarily as thrust bearings, there are also radial bearings 58 positioned above and below bearing chamber 20, and within the area sealed by seals 24 and 26. As shown in FIG. 1, one of the radial bearings 58 is incorporated into the portion of housing 14 that is also part of clamp 36.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A bearing assembly comprising:
   a bearing chamber;
   an inner mandrel having a first load bearing shoulder and an outer housing having an second load bearing shoulder, the first and second load bearing shoulders being opposed and within the bearing chamber;
   seals that retain a bearing lubricant within the bearing chamber; and
   a stack of bearings comprising a cylindrical stack of three or more rows of bidirectional ball bearings between the first and the second load bearing shoulders and between the seals, each row of bearings comprising an inner race supporting the first load bearing shoulder and an outer race supporting the second load bearing shoulder, and the stack of bearings defining a mud flow path between the first and the second load bearing shoulders that opens upon failure of the seals.

2. The bearing assembly of claim 1, wherein the cylindrical stack comprises 6 or more rows of bidirectional ball bearings.

3. The bearing assembly of claim 1, wherein the cylindrical stack comprises 8 or more rows of bidirectional ball bearings.

4. A bearing assembly, comprising:
   a bearing chamber;
   an inner mandrel having a first load bearing shoulder and an outer housing having an second load bearing shoulder, the first and second load bearing shoulders being opposed and within the bearing chamber;
   a cylindrical stack of one or more rows of bearings disposed between the first and second load bearing shoulders, each row of bearings comprising an inner race supporting the first load bearing shoulder and an outer race supporting the second load bearing shoulder;
   a first bearing clamp supporting the outer race of the bearings adjacent to the first load bearing shoulder and a second bearing clamp supporting the inner race of the bearings adjacent to the second load bearing shoulder;
   at least one of the first bearing clamp and the second bearing clamp comprising a threaded collar that engages a threaded portion on the inner mandrel or outer housing, the threaded collar selectively applies pressure to the race that is not supported by the respective load bearing shoulder, the threaded collar comprising an engagement profile that selectively engages one of the inner mandrel and the outer housing in a selected rotational position along the threaded portion.

5. The bearing assembly of claim 4, wherein the first bearing clamp comprises the threaded collar and the threaded portion is on the inner mandrel.

6. The bearing assembly of claim 4, further comprising a lubricant within the bearing chambers and seals to retain the lubricant.

7. The bearing assembly of claim 4, further comprising a spring element between the bearings and at least one of the first bearing clamp and the second bearing clamp.

8. The bearing assembly of claim 7, wherein the spring element is a Belleville spring element.

9. The bearing assembly of claim 4, wherein the engagement profile comprises longitudinal slots on an inner surface of the outer housing and an outer surface of the inner housing.

10. The bearing assembly of claim 9, wherein the number of longitudinal slots on the inner surface of the outer housing differs from the number of longitudinal slots on the outer surface of the inner mandrel.

* * * * *